(12) United States Patent
Takai et al.

(10) Patent No.: US 12,146,060 B2
(45) Date of Patent: Nov. 19, 2024

(54) ULTRAVIOLET CURABLE ORGANOPOLYSILOXANE COMPOSITION

(71) Applicant: SHIN-ETSU CHEMICAL CO., LTD., Tokyo (JP)

(72) Inventors: Misaki Takai, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 562 days.

(21) Appl. No.: 17/623,102

(22) PCT Filed: Jun. 26, 2020

(86) PCT No.: PCT/JP2020/025200
§ 371 (c)(1),
(2) Date: Dec. 27, 2021

(87) PCT Pub. No.: WO2021/010135
PCT Pub. Date: Jan. 21, 2021

(65) Prior Publication Data
US 2022/0259432 A1    Aug. 18, 2022

(30) Foreign Application Priority Data

Jul. 17, 2019  (JP) ................. 2019-131752

(51) Int. Cl.
| | |
|---|---|
| C08L 83/04 | (2006.01) |
| C08G 77/20 | (2006.01) |
| C08G 77/24 | (2006.01) |
| C08G 77/28 | (2006.01) |
| C08J 3/28 | (2006.01) |
| C08K 5/549 | (2006.01) |

(52) U.S. Cl.
CPC .......... *C08L 83/04* (2013.01); *C08G 77/20* (2013.01); *C08G 77/24* (2013.01); *C08G 77/28* (2013.01); *C08J 3/28* (2013.01); *C08K 5/549* (2013.01); *C08G 2150/00* (2013.01); *C08G 2170/00* (2013.01); *C08G 2190/00* (2013.01); *C08L 2312/06* (2013.01)

(58) Field of Classification Search
None
See application file for complete search history.

(56) References Cited

U.S. PATENT DOCUMENTS

| | | | |
|---|---|---|---|
| 4,340,709 A * | 7/1982 | Jeram .................. | C08L 83/04 264/328.17 |
| 5,013,577 A * | 5/1991 | Wright .................. | C07F 7/10 427/515 |
| 5,110,967 A * | 5/1992 | King .................. | C08K 5/549 556/407 |
| 5,254,645 A | 10/1993 | King et al. | |
| 7,767,754 B2 * | 8/2010 | Zhu .................. | C08L 83/04 524/588 |
| 7,887,881 B2 * | 2/2011 | Lu .................. | C09D 5/00 427/331 |
| 8,367,212 B2 | 2/2013 | Irifune | |
| 8,907,006 B1 * | 12/2014 | Rincon .................. | C08G 77/20 428/404 |
| 10,012,904 B2 * | 7/2018 | Kitson .................. | G03F 7/038 |
| 10,093,815 B2 * | 10/2018 | Mori .................. | H01L 21/306 |
| 11,168,184 B2 * | 11/2021 | Tani .................. | C08F 236/10 |
| 11,492,490 B2 * | 11/2022 | Tasaki .................. | C08L 83/04 |

(Continued)

FOREIGN PATENT DOCUMENTS

| | | |
|---|---|---|
| JP | 58-89650 A | 5/1983 |
| JP | 6-172535 A | 6/1994 |

(Continued)

OTHER PUBLICATIONS

International Search Report for PCT/JP2020/025200 mailed on Sep. 15, 2020.

(Continued)

*Primary Examiner* — Sanza L. McClendon
(74) *Attorney, Agent, or Firm* — Birch, Stewart, Kolasch & Birch, LLP

(57) ABSTRACT

Provided are an ultraviolet curable organopolysiloxane composition having a favorable ultraviolet curability; and a cured product thereof that has a favorable adhesiveness. The ultraviolet curable organopolysiloxane composition contains:

(A) a compound represented by the following general formula (1)

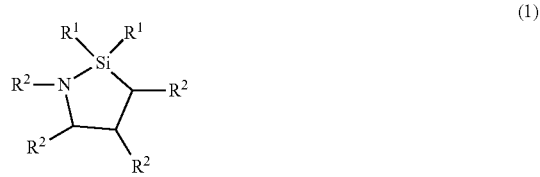

(1)

wherein $R^1$ represents a substituted or unsubstituted monovalent hydrocarbon group having 1 to 20 carbon atoms or an alkoxy group having 1 to 3 carbon atoms, the multiple $R^1$s may be identical to or different from each other, and each $R^2$ independently represents a hydrogen atom, a substituted or unsubstituted monovalent hydrocarbon group having 1 to 20 carbon atoms or a triorganosilyl group; and an ultraviolet curable organopolysiloxane.

7 Claims, No Drawings

(56) References Cited

U.S. PATENT DOCUMENTS

| | | | |
|---|---|---|---|
| 2002/0074086 A1* | 6/2002 | Nakamura | C09J 183/04 |
| | | | 524/731 |
| 2007/0298223 A1 | 12/2007 | Loch et al. | |
| 2015/0376365 A1 | 12/2015 | Halbach | |
| 2016/0001237 A1* | 1/2016 | Halbach | B01D 71/80 |
| | | | 521/154 |
| 2016/0168429 A1 | 6/2016 | Arkles et al. | |

FOREIGN PATENT DOCUMENTS

| | | |
|---|---|---|
| JP | 3894873 B2 | 3/2007 |
| JP | 2008-527077 A | 7/2008 |
| JP | 2008-195931 A | 8/2008 |
| JP | 2016-513160 A | 5/2016 |
| JP | 2018-506505 A | 3/2018 |
| JP | 2019-14801 A | 1/2019 |
| WO | WO 2016/061058 A1 | 4/2016 |

OTHER PUBLICATIONS

Written Opinion of the International Searching Authority for PCT/JP2020/025200 (PCT/ISA/237) mailed on Sep. 15, 2020.
Extended European Search Report dated Jun. 21, 2023 for Application No. 20839967.5.

\* cited by examiner

ULTRAVIOLET CURABLE ORGANOPOLYSILOXANE COMPOSITION

TECHNICAL FIELD

The present invention relates to an ultraviolet curable organopolysiloxane composition having a favorable ultraviolet curability and adhesiveness; and an elastomer molded product (silicone rubber cured product) obtained by curing such ultraviolet curable organopolysiloxane composition.

BACKGROUND ART

Various fields are now aggressively seeing simplification and cost reduction in production process, accompanied by a trend of lower energy consumption in consideration of environment. Particularly, improvements are demanded in processes for producing, for example, optical devices, electric/electronic devices and displays, because many of these processes employ a high-temperature heating step(s) requiring a tremendous amount of energy, time and equipments, as there is a need to cure, for example, an adhesive material, a sealing material and/or a filling material. Further, improvements in such high-temperature heating step have a great significance not only in terms of energy and cost, but also in terms of a production technique of not damaging other members.

In recent years, in order to solve these problems, ultraviolet curable silicone compositions are now gaining attention. An ultraviolet curable silicone composition contains an ultraviolet curable organopolysiloxane and a photopolymerization initiator or photocrosslinking initiator activatable via ultraviolet irradiation, where the polymerization or crosslinking reaction of such ultraviolet curable organopolysiloxane progresses upon ultraviolet irradiation, and the composition usually cures in a short period of time of several tens of seconds to ten odd seconds. Thus, in a production process using an ultraviolet curable silicone composition, other members are rarely damaged, and large equipments are not required as well.

In the past, as an ultraviolet curable silicone composition, there have been invented, for example, a photocationic polymerization agent-containing composition (Patent document 1), and a radical polymerization agent-containing composition (Patent document 2). In the former case, since the composition contains an onium salt generating acids upon ultraviolet irradiation, there is a concern that when the ultraviolet curable silicone composition is used on, for example, an electric/electronic substrate, the substrate may be corroded. In the latter case, the composition has a characteristic that it is capable of being cured in a short period of time due to a fast reaction speed owing to a high reaction activity thereof; on the other hand, a radical lifetime is extremely short such that the radical polymerization agent will be easily deactivated by oxygen or the like. As a result, a curability on the surface of the composition that is in contact with air may be significantly impaired; the radical polymerization agent-containing ultraviolet curable silicone composition was unable to exhibit a satisfactory ultraviolet curability and adhesiveness.

PRIOR ART DOCUMENTS

Patent Documents

Patent document 1: JP-A-2008-195931
Patent document 2: Japanese Patent No. 3894873

SUMMARY OF THE INVENTION

Problems to be Solved by the Invention

Thus, it is an object of the present invention to provide, for example, an ultraviolet curable organopolysiloxane composition whose ultraviolet curability and adhesiveness are both favorable.

Means to Solve the Problems

The inventor of the present invention diligently conducted a series of studies to achieve the above object, and completed the invention as follows. That is, the inventor found that there could be obtained an ultraviolet curable organopolysiloxane composition having a favorable ultraviolet curability and adhesiveness, by combining a cyclic azasilane represented by the following general formula (1) and serving as an adhesion promoter; with an ultraviolet curable organopolysiloxane.

In other words, the present invention is to provide, for example, the following ultraviolet curable organopolysiloxane composition; a sealing agent, coating agent or adhesive agent containing such composition; a molded product made of a cured product of such composition.

[1]

An ultraviolet curable organopolysiloxane composition comprising:
(A) a compound represented by the following general formula (1)

[Chemical formula 1]

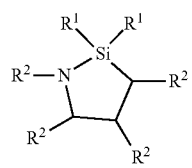

(1)

wherein $R^1$ represents a substituted or unsubstituted monovalent hydrocarbon group having 1 to 20 carbon atoms or an alkoxy group having 1 to 3 carbon atoms, the multiple $R^1$s may be identical to or different from each other, and each $R^2$ independently represents a hydrogen atom, a substituted or unsubstituted monovalent hydrocarbon group having 1 to 20 carbon atoms or a triorganosilyl group; and an ultraviolet curable organopolysiloxane.

[2]

The ultraviolet curable organopolysiloxane composition according to [1], wherein in the general formula (1), the $R^2$ bonded to the nitrogen atom represents a substituted or unsubstituted monovalent hydrocarbon group or a triorganosilyl group, and each of the $R^2$s bonded to the carbon atoms independently represents a hydrogen atom or an unsubstituted monovalent hydrocarbon group having 1 to 20 carbon atoms.

[3]

The ultraviolet curable organopolysiloxane composition according to [1] or [2], comprising:
(A) 0.05 to 10 parts by mass of the compound represented by the general formula (1);
(B) 100 parts by mass of a linear or branched ultraviolet curable organopolysiloxane whose molecule each has on average 1 to 4 groups represented by the following general formula (2), and whose main chain is composed of repeating diorganosiloxane units

[Chemical formula 2]

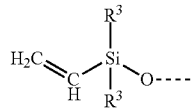
(2)

wherein $R^3$ represents a substituted or unsubstituted monovalent hydrocarbon group having 1 to 20 carbon atoms, the multiple $R^a$s may be identical to or different from each other, and a chain line represents a bond;

(C) 1 to 20 parts by mass of a linear or branched organopolysiloxane whose molecule each has at least two groups represented by a partial structural formula of the following general formula (3), and whose main chain is composed of repeating diorganosiloxane units

[Chemical formula 3]

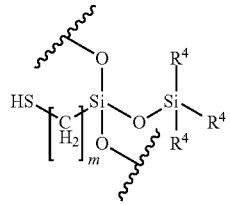
(3)

wherein $R^4$ represents a substituted or unsubstituted monovalent hydrocarbon group having 1 to 20 carbon atoms, the multiple $R^4$s may be identical to or different from each other, and m is an integer of 1 to 20; and (D) 0.1 to 10 parts by mass of a photopolymerization initiator.

[4]
The ultraviolet curable organopolysiloxane composition according to [3], wherein the component (B) is a linear ultraviolet curable organopolysiloxane.

[5]
The ultraviolet curable organopolysiloxane composition according to [1] or [2], comprising:
(A) 0.05 to 10 parts by mass of the compound represented by the general formula (1);
(D) 0.1 to 10 parts by mass of a photopolymerization initiator; and
(E) 100 parts by mass of an ultraviolet curable organopolysiloxane represented by the following general formula (4)

[Chemical formula 4]

$(R^5)_3Si—X—[Si(R^5)_2O]_n—Si(R^5)_2—X—Si(R^5)_3$ (4)

wherein each $R^5$ independently represents a group selected from a substituted or unsubstituted monovalent hydrocarbon group having 1 to 10 carbon atoms, an acryloxy group, a methacryloxy group, an acryloxyalkyl group and a methacryloxyalkyl group, each molecule has at least two groups selected from an acryloxy group, a methacryloxy group, an acryloxyalkyl group and a methacryloxyalkyl group, n is an integer of 10 or larger, and X represents an oxygen atom or a divalent hydrocarbon group having 2 to 6 carbon atoms.

[6]
A sealing agent, coating agent or adhesive agent comprising the ultraviolet curable organopolysiloxane composition according to any one of [1] to [5].

[7]
A molded product using a cured product of the ultraviolet curable organopolysiloxane composition according to any one of [1] to [5].

Effects of the Invention

The ultraviolet curable organopolysiloxane composition of the present invention has both a favorable ultraviolet curability and a favorable adhesiveness, and is thus useful for producing an optical device, an electric/electronic device, a display and the like.

MODE FOR CARRYING OUT THE INVENTION

The present invention is described in detail hereunder.
[Component (A)]
A cyclic azasilane compound as a component (A) is an essential component (adhesiveness imparting agent) for imparting an adhesiveness to a cured product (silicone rubber cured product) of the ultraviolet curable organopolysiloxane composition of the present invention, and is a compound represented by the following general formula (1).

[Chemical formula 5]

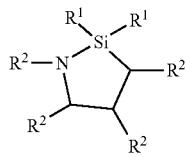
(1)

(In the formula (1), $R^1$ represents a substituted or unsubstituted monovalent hydrocarbon group having 1 to 20 carbon atoms or an alkoxy group having 1 to 3 carbon atoms; the multiple $R^1$s may be identical to or different from each other. Each $R^2$ independently represents a hydrogen atom, a substituted or unsubstituted monovalent hydrocarbon group having 1 to 20 carbon atoms or a triorganosilyl group.)

Here, in the general formula (1), among the four $R^2$s in the molecule, it is preferred that the $R^2$ bonded to the nitrogen atom represent a substituted or unsubstituted monovalent hydrocarbon group having 1 to 20 carbon atoms or a triorganosilyl group (particularly, an alkyl group having 1 to 6 carbon atoms or a trialkylsilyl group); and that each of the other three $R^2$s bonded to the carbon atoms independently represent a hydrogen atom or an unsubstituted monovalent hydrocarbon group having 1 to 20 carbon atoms (particularly, a hydrogen atom or an alkyl group having 1 to 6 carbon atoms).

As for $R^1$ and $R^2$, as the substituted or unsubstituted monovalent hydrocarbon group having 1 to 20 carbon atoms, there may be listed, for example, unsubstituted monovalent hydrocarbon groups including, for example, an alkyl group such as a methyl group, an ethyl group, a propyl group, an isopropyl group, a butyl group, an isobutyl group, a sec-butyl group, a tert-butyl group, a pentyl group, a hexyl group, a cyclohexyl group, an octyl group, a 2-ethylhexyl group, a nonyl group and a decyl group, an alkenyl group such as a vinyl group, an allyl group, a propenyl group and an isopropenyl group, an aryl group such as a phenyl group, and an aralkyl group such as a benzyl group; as well as monovalent hydrocarbon groups obtained by substituting part of or all the hydrogen atoms bonded to the carbon atoms in any of these unsubstituted monovalent hydrocarbon groups with, for example, halogen atoms such as a fluorine atom, bromine atom and iodine atom. Examples of such monovalent hydrocarbon group substituted by halogen atoms or the like include halogen-substituted alkyl groups such as a chloromethyl group, 2-bromoethyl group and 3,3,3-trifluoropropyl group. As these substituted or unsubstituted monovalent hydrocarbon groups having 1 to 20 carbon atoms, there may be listed alkyl groups preferably having about 1 to 10 carbon atoms, more preferably having about 1 to 6 carbon atoms.

As for $R^1$, examples of the alkoxy group having 1 to 3 carbon atoms include a methoxy group, an ethoxy group, a propoxy group and an isopropoxy group. Further, as for $R^2$, examples of the triorganosilyl group include trialkylsilyl groups substituted by alkyl groups having 1 to 3 carbon atoms, such as a trimethylsilyl group, a triethylsilyl group, a tripropylsilyl group and a tri(isopropyl)silyl group. Particularly, as $R^1$, preferred are a methyl group, an ethyl group, a methoxy group and an ethoxy group. As $R^2$, preferred are a hydrogen atom; a lower alkyl group such as a methyl group, an ethyl group, an n-propyl group, an isopropyl group and an n-butyl group; and a trialkylsilyl group such as a trimethylsilyl group and a triethylsilyl group. Further, among the four $R^2$s in the molecule, it is particularly preferred that the $R^2$ bonded to the nitrogen atom be the aforementioned lower alkyl group or trialkylsilyl group, and that each of the other $R^2$s bonded to the three carbon atoms in the molecule independently be a hydrogen atom or the aforementioned lower alkyl group. Here, among the $R^2$s bonded to the three carbon atoms in the molecule, it is preferred that at least two of them are hydrogen atoms.

The component (A) is added in an amount of 0.05 to 10 parts by mass, particularly preferably 0.2 to 3 parts by mass, per 100 parts by mass of each of a later-described component (B) or (E). When the amount of the component (A) added is smaller than 0.05 parts by mass, there may not be achieved a sufficient adhesiveness; when the amount of the component (A) added is greater than 10 parts by mass, a disadvantage in cost may be incurred, and a poor storage stability of the composition may be observed.

More specific examples of the component (A) include those expressed by the following formulae.

[Chemical formula 6]

(In each of the above formulae, Me represents a methyl group.)

[Component (B)]

In the ultraviolet curable organopolysiloxane composition of the present invention, an ultraviolet curable organopolysiloxane serves as a main agent (base polymer); as such ultraviolet curable organopolysiloxane, preferred is the following ultraviolet curable organopolysiloxane as a component (B), or a later-described ultraviolet curable organopolysiloxane as a component (E). The component (B) is a linear or branched ultraviolet curable organopolysiloxane whose molecule each has on average 1 to 4, preferably 1 to 2, more preferably 2 vinyl group-containing siloxy groups (vinyl diorganosiloxy groups) represented by the following general formula (2) (the vinyl group-containing siloxy group is preferably present at a molecular chain end, more preferably at both molecular chain ends); and whose main chain is substantially composed of repeating diorganosiloxane units.

[Chemical formula 7]

(2)

$$H_2C=\underset{H}{\overset{R^3}{C}}-\underset{R^3}{\overset{R^3}{Si}}-O----$$

(In the formula (2), $R^3$ represents a substituted or unsubstituted monovalent hydrocarbon group having 1 to 20 carbon atoms; the multiple $R^3$s may be identical to or different from each other. A chain line represents a bond.)

In the general formula (2), as the unsubstituted monovalent hydrocarbon group represented by $R^3$ that has 1 to 20 carbon atoms, there may be listed, for example, an alkyl group such as a methyl group, an ethyl group, a propyl group, an isopropyl group, a butyl group, an isobutyl group, a tert-butyl group, a hexyl group, a cyclohexyl group, an octyl group, a 2-ethylhexyl group and a decyl group; an alkenyl group such as a vinyl group, an allyl group, a propenyl group, an isopropenyl group and a butenyl group; an aryl group such as a phenyl group, a tolyl group, a xylyl group and a naphthyl group; and an aralkyl group such as a benzyl group, a phenylethyl group and a phenylpropyl group. Further, as the substituted monovalent hydrocarbon group represented by $R^3$ that has 1 to 20 carbon atoms, there may be listed, for example, halogen-substituted hydrocarbon groups obtained by substituting part of or all the hydrogen atoms bonded to the carbon atoms in any of the above unsubstituted monovalent hydrocarbon groups having 1 to 20 carbon atoms with halogen atoms, such as a chloromethyl group, a bromoethyl group and a trifluoropropyl group; and cyano-substituted hydrocarbon groups obtained by substituting part of or all the hydrogen atoms bonded to the carbon atoms in any of the above unsubstituted monovalent hydrocarbon groups having 1 to 20 carbon atoms with a cyano group(s), such as a cyanoethyl group. As $R^3$, an alkyl group or an alkenyl group is preferred among these examples; more preferred are a methyl group and a vinyl group. Further, of the two $R^3$s in the vinyl group-containing siloxy group represented by the general formula (2), it is preferred that at least one $R^3$, more preferably each of the two $R^3$'s be the above alkenyl group, especially a vinyl group.

Examples of the vinyl group-containing siloxy group represented by the general formula (2) include a trivinylsiloxy group, a methyldivinylsiloxy group, a dimethylvinylsiloxy group and a vinylmethylphenylsiloxy group, of which a trivinylsiloxy group and a methyldivinylsiloxy group are preferred.

A bonding position of the group (vinyl group-containing siloxy group) represented by the general formula (2) in the molecule of the ultraviolet curable organopolysiloxane as the component (B), may be at the molecular chain end(s) and/or at moieties other than the molecular chain ends (i.e. midway of molecular chain, or side chain of molecular chain); it is desired that the vinyl group-containing siloxy group represented by the general formula (2) is preferably present at the molecular chain end, more preferably at both molecular chain ends.

In the molecule of the ultraviolet curable organopolysiloxane as the component (B), as a silicon atom-bonded organic group other than the group (vinyl group-containing siloxy group) represented by the general formula (2), there may be listed, for example, those similar to the abovementioned examples of $R^3$, preferably a substituted or unsubstituted monovalent hydrocarbon group normally having 1 to 12, preferably 1 to 10 carbon atoms, other than an aliphatic unsaturated group. Examples of such substituted or unsubstituted monovalent hydrocarbon group include an alkyl group such as a methyl group, an ethyl group, a propyl group, a butyl group, a pentyl group, a hexyl group and a heptyl group; a cycloalkyl group such as a cyclohexyl group; an aryl group such as a phenyl group, a tolyl group, a xylyl group and a naphthyl group; an aralkyl group such as a benzyl group and a phenethyl group; and halogenated alkyl groups obtained by substituting part of or all the hydrogen atoms in any of these groups with halogen atoms such as a chlorine atom, fluorine atom and bromine atom, the examples of such halogenated alky groups including a chloromethyl group, 3-chloropropyl group and 3,3,3-trifluoropropyl group. In terms of ease in synthesis, it is preferred that such substituted or unsubstituted monovalent hydrocarbon group be an alkyl group, an aryl group or a halogenated alkyl group, more preferably a methyl group, a phenyl group or a trifluoropropyl group.

Further, the ultraviolet curable organopolysiloxane as the component (B) is basically a linear or branched organopolysiloxane (the branched organopolysiloxane includes those having a linear structure whose main chain is partially branched) whose main chain is composed of repeating diorganosiloxane units; preferably a linear diorganopolysiloxane with both molecular chain ends being blocked by the group (vinyl group-containing siloxy group) represented by the general formula (2). The component (B) may be a single polymer having these molecular structures, a copolymer comprised of these molecular structures, or a mixture of two or more of these polymers.

In terms of workability of the composition and mechanical properties of the cured product, it is preferred that a viscosity of the component (B) at 25° C. be 100 to 500,000 mPa·s, more preferably 200 to 200,000 mPa·s, particularly preferably 300 to 100,000 mPa·s. Here, in the present invention, viscosity can be measured by a rotary viscometer (e.g. BL type, BH type, BS type, cone-plate type, a rheometer). Normally, in the case of a linear organopolysiloxane, the above viscosity range(s) corresponds to a number average polymerization degree of about 30 to 2,000, preferably about 50 to 1,500, even more preferably about 70 to 1,200. In the present invention, polymerization degree (or molecular weight) can, for example, be obtained as a number average polymerization degree (or number average molecular weight) in terms of polystyrene in a gel permeation chromatography (GPC) analysis using toluene or the like as a developing solvent.

It is preferred that the component (B) be contained in the composition of the present invention by an amount of 50 to 97% by mass, more preferably 80 to 96% by mass.

[Component (C)]

A component (C) is a linear or branched organopolysiloxane whose molecule each has at least two mercapto alkyl groups i.e. at least two groups represented by a partial structural formula of the following general formula (3); and whose main chain is composed of repeating diorganosiloxane units.

[Chemical formula 8]

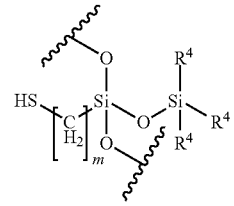

(3)

(In the formula (3), $R^4$ represents a hydrogen atom, or a substituted or unsubstituted monovalent hydrocarbon group having 1 to 20 carbon atoms; the multiple $R^4$s may be identical to or different from each other. m is an integer of 1 to 20.)

The component (C) is a component serving as a cross-linking agent (curing agent) in the ultraviolet curable organopolysiloxane composition of the present invention; and has, in one molecule, at least 2, preferably 2 to 30, more preferably 3 to 20, even more preferably 4 to 10 groups represented by the above general formula (3).

In the general formula (3), as the unsubstituted monovalent hydrocarbon group represented by $R^4$ that has 1 to 20 carbon atoms, there may be listed, for example, an alkyl group such as a methyl group, an ethyl group, an n-propyl group, an isopropyl group, an n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; a cycloalkyl group such as a cyclopentyl group and a cyclohexyl group; an alkenyl group such as a vinyl group, an allyl group, a butenyl group, a pentenyl group and a hexenyl group; an aryl group such as a phenyl group, a tolyl group, a xylyl group and an α-, β-naphthyl group; an aralkyl group such as a benzyl group, a 2-phenylethyl group and a 3-phenylpropyl group; as well as groups obtained by substituting part of or all the hydrogen atoms in any of these groups with, for example, a cyano group(s) or halogen atoms such as F, Cl and Br atoms, the examples of such substituted groups including a 3-chloropropyl group, 3,3,3-trifluoropropyl group and 2-cyanoethyl group. Even among these examples, a methyl group, an ethyl group and a phenyl group are preferred; a methyl group is particularly preferred in terms of availability, productivity and cost. m is an integer of 1 to 20, preferably an integer of 1 to 5.

Further, the component (C) may, for example, be a linear, branched, partially branched linear or dendrimer-like organopolysiloxane; preferably a linear or partially branched linear organopolysiloxane; more preferably a linear (or partially branched linear) organopolysiloxane whose main chain has a repetitive structure of the divalent siloxane units (i.e. (triorganosiloxy)(mercaptoalkyl)siloxane units) represented by the partial structural formula of the general formula (3), and whose both molecular chain ends are blocked by silicon atom-bonded hydroxyl groups (silanol groups) (i.e. side chain (mercaptoalkyl group/triorganosiloxy group) modified linear organopolysiloxane). However, the component (C) is not limited to these examples.

Here, in the molecule of the organopolysiloxane as the component (C), the number of repetitions (or polymerization degree) of the divalent siloxane units that compose the main chain and are represented by the partial structural formula of the general formula (3) is at least 2, preferably 2 to 30, more preferably 3 to 20, even more preferably about 4 to 10.

Further, the component (C) may be a single polymer having these molecular structures, a copolymer comprised of these molecular structures, or a mixture of these polymers.

Moreover, the component (C) is added in an amount of 1 to 20 parts by mass per 100 parts by mass of the component (B). When the amount of the component (C) added is smaller than 1 part by mass, there may not be achieved a sufficient curability; when the amount of the component (C) added is larger than 20 parts by mass, there may not be obtained a cured product having target properties.

[Component (D)]

A photopolymerization initiator as a component (D) may be that conventionally used in an ultraviolet curable organopolysiloxane composition. Specific examples thereof include acetophenone, propiophenone, benzophenone, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetyl benzene, 3-methoxybenzophenone, 4-methylbenzophenone, 4-chlorobenzophenone, 4,4'-dimethoxybenzophenone, 2,2-diethoxyacetophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl-1[4-(methylthio) phenyl]-2-morpholino-1-one, 2-benzyl-2-dimethylamino-1-(4-morpholinophenyl)-butanone, 1-[4-(2-hydroxyethoxy) phenyl]-2-methyl-1-propane-1-one, 2,2-dimethoxy-2-phenylacetophenone, 2-hydroxy-2-methyl-1-phenyl-propane-1-one and cyclohexyl phenyl ketone.

The component (D) is added in an amount of 0.1 to 10 parts by mass per 100 parts by mass of the component (B). When the amount of the component (D) added is smaller than 0.1 parts by mass, the effect thereof will be insignificant; when the amount of the component (D) added is greater than 10 parts by mass, the cured product obtained will be subjected to a greater influence of a decomposition residue of the component (D) such that poor physical properties may be observed. Further, one kind of the component (D) may be used alone, or two or more kinds thereof may be mixed before use.

As the ultraviolet curable organopolysiloxane composition of the present invention, other than the above-described ultraviolet curable organopolysiloxane composition containing the components (A) to (D), there may also be employed an ultraviolet curable organopolysiloxane composition of such an embodiment that contains the component (A), the component (D), the component (B) and a later-described component (E) as a substitute for the component (C).

[Component (E)]

A component (E) used in the present invention serves as a main agent (base polymer) of the ultraviolet curable organopolysiloxane composition of the present invention, is an ultraviolet curable component cross-linkable (curable) when irradiated with an ultraviolet light, and is a linear ultraviolet curable organopolysiloxane represented by the following general formula (4).

[Chemical formula 9]

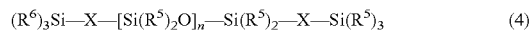

$(R^6)_3Si-X-[Si(R^5)_2O]_n-Si(R^5)_2-X-Si(R^5)_3$ (4)

(In the formula (4), each $R^5$ independently represents a group selected from a substituted or unsubstituted monovalent hydrocarbon group having 1 to 10 carbon atoms, an acryloxy group, a methacryloxy group, an acryloxyalkyl group and a methacryloxyalkyl group; each molecule has at least two groups selected from an acryloxy group, a methacryloxy group, an acryloxyalkyl group and a methacryloxyalkyl group. n is an integer of 10 or larger. X represents an oxygen atom or a divalent hydrocarbon group having 2 to 6 carbon atoms.)

Here, as the substituted or unsubstituted monovalent hydrocarbon group represented by $R^5$ that has 1 to 10 carbon atoms, a monovalent hydrocarbon group having 1 to 8 carbon atoms is preferred, specific examples of which include an alkyl group such as a methyl group, an ethyl group, a propyl group, an isopropyl group, a butyl group, an isobutyl group, a sec-butyl group, a tert-butyl group, a pentyl group, a hexyl group, an octyl group and a 2-ethylhexyl group; a cycloalkyl group such as a cyclohexyl group; and an aryl group such as a phenyl group. More preferred is an alkyl group having 1 to 6 carbon atoms or an aryl group.

Further, at least two of the $R^5$s in the formula (4), normally 2 to 10, preferably 2 to 6, more preferably 4 to 6 of them are one or more kinds of groups selected from an acryloxy group (acryloyloxy group), a methacryloxy group (methacryloyloxy group), an acryloxyalkyl group (acryloyloxy group-substituted alkyl group) and a methacryloxyalkyl group (methacryloyloxy group-substituted alkyl group). Examples of the acryloxyalkyl group include an acryloxymethyl group, an acryloxyethyl group, an acryloxypropyl group and an acryloxybutyl group. Examples of the methacryloxyalkyl group include a methacryloxymethyl group, a methacryloxyethyl group, a methacryloxypropyl group and a methacryloxybutyl group. Among the $R^5$s in the formula (4), these (meth)acrylic functional groups may be those bonded to the silicon atoms at the molecular chain ends, and/or those bonded to the silicon atoms at moieties other than the molecular chain ends (midway of molecular chain); it is desired that each of the silicon atoms at both molecular chain ends has at least one (meth)acrylic functional group (2 or more in total at both molecular chain ends), preferably 2 or 3 (meth)acrylic functional groups (4 to 6 in total at both molecular chain ends).

n in the formula (4) is an integer of 10 or larger. It is preferred that n be an integer of 10 to 1,000, more preferably an integer of 20 to 500, even more preferably an integer of 50 to 300. It is preferable when n is 10 or larger because there can be obtained a cured product with superior physical and mechanical strengths; it is also preferable when n is not larger than 1,000 because a favorable workability will be achieved at the time of use as the composition in an uncured state will not exhibit an extremely high viscosity. The value of n (or polymerization degree) may, for example, be calculated as a number average polymerization degree in terms of polystyrene in the aforementioned GPC analysis, or as a number average value in a 29Si-NMR measurement or the like.

X in the formula (4) represents an oxygen atom or a divalent hydrocarbon group having 2 to 6, preferably 2 to 4 carbon atoms; examples of such divalent hydrocarbon group include alkylene groups such as an ethylene group, a propylene group (trimethylene group), a tetramethylene group and a hexamethylene group.

Other than the combination of the components (A) to (D), or the combination of the components (A), (D) and (E), other components, if necessary, may also be optionally added to the composition of the present invention on a premise that the effects of the present invention will not be impaired. Examples of such other components include a silica-based filler such as a fumed silica that does not inhibit a curing reaction by ultraviolet; an extender such as a silicone rubber powder and calcium carbonate; an adhesiveness imparting agent such as alkoxyorganosilane contributing to an improvement in adhesiveness and stickiness; a heat resistance additive; and a flame retardancy imparting agent.

Production Method

The composition of the present invention can be obtained by, for example, mixing, in any order, the component (A) and other components if necessary, and then stirring them. Further, the composition of the present invention can also be obtained by, for example, mixing, in any order, the components (A) to (D) and other components if necessary, or the components (A), (D) and (E) as well as other components if necessary, and then stirring them.

There are no particular restrictions on a device used for the operation such as stirring; there may be used, for example, a grinding machine, a triple roll mill, a ball mill and a planetary mixer. Further, these devices may be appropriately used in combination.

Curing Method

When curing the composition of the present invention, the composition is to be irradiated with an ultraviolet light so as to be cured. Here, an ultraviolet light having a wavelength of 250 to 450 nm, particularly 250 to 380 nm is effective; and an irradiation dose of such ultraviolet light is 1,000 to 10,000 mJ/cm$^2$, particularly preferably 2,000 to 5,000 mJ/cm$^2$. A curing temperature may be room temperature, normally 25° C.±10° C.

The ultraviolet curable organopolysiloxane composition of the present invention is useful as an adhesive agent and a sealing agent, especially as an adhesive agent for use on a metal substrate.

WORKING EXAMPLES

The present invention is specifically described hereunder with reference to working and comparative examples; the present invention shall not be limited to the following working examples. Here, in the specific examples below, "parts" refers to "parts by mass," and a viscosity refers to a value measured by a rotary viscometer at 25° C. Further, Me represents a methyl group, and Ph represents a phenyl group.

Component (B)

(B-1) Linear dimethylpolysiloxane represented by the following formula (5) and having a viscosity of 100,000 mPa·s, where two vinyl group-containing siloxy groups (trivinylsiloxy groups) are present in each molecule and are individually located at both molecular chain ends (i.e. one vinyl group-containing siloxy group at each molecular chain end), and a main chain is composed of repeating dimethylsiloxane units.

[Chemical formula 10]

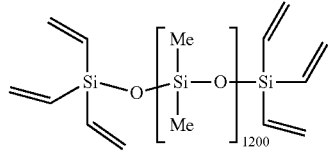

(5)

(B-2) Linear (3,3,3-trifluoropropyl)methylsiloxane-dimethylsiloxane copolymer represented by the following formula (6) and having a viscosity of 400 mPa·s, where two vinyl group-containing siloxy groups (trivinylsiloxy groups) are present in each molecule and are individually located at both molecular chain ends (i.e. one vinyl group-containing siloxy group at each molecular chain end), and a main chain is composed of repeating trifluoropropyl methylsiloxane units and dimethylsiloxane units.

[Chemical formula 11]

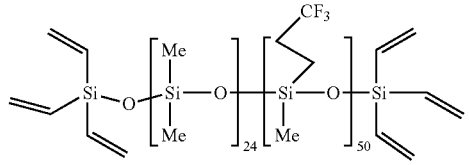

(6)

Component (C)

(C-1) γ-mercaptopropyl group-containing organopolysiloxane represented by the following formula (7) (by Shin-Etsu Chemical Co., Ltd.)

[Chemical formula 12]

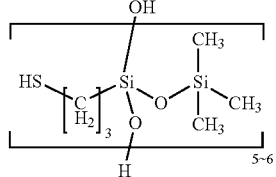

(7)

Component (D)

(D-1) 2,2-diethoxyacetophenone (by Tokyo Chemical Industry Co., Ltd.)

(D-2) 2-hydroxy-2-methyl-1-phenyl-propane-1-one (by BASF)

Component (E)

(E-1) Linear phenylmethylsiloxane-dimethylsiloxane copolymer represented by the following formula (8) and having a viscosity of 3,000 mPa·s, where two β-methacryloxyethyl group-containing silylethyl groups (bis(β-methacryloxyethyl)(methyl)silylethyl groups) are present in each molecule and are individually located at both molecular chain ends (i.e. one β-methacryloxyethyl group-containing silylethyl group at each molecular chain end), and a main chain is composed of repeating dimethylsiloxane units and phenylmethylsiloxane units.

[Chemical formula 13]

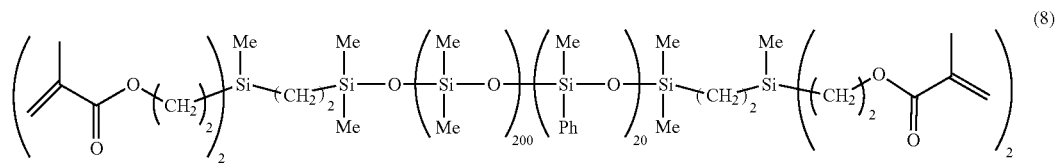

Component (A)

(A-1) Compound represented by the following formula (9) (by Shin-Etsu Chemical Co., Ltd.)

[Chemical formula 14]

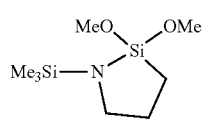

(A-2) Compound represented by the following formula (10) (by Gelest, Inc.)

[Chemical formula 15]

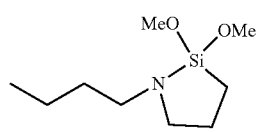

(A-3) Compound represented by the following formula (11) (by Gelest, Inc.)

[Chemical formula 16]

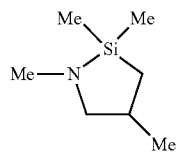

(A-4) Compound represented by the following formula (12) (KBM5103 by Shin-Etsu Chemical Co., Ltd.) (for use in comparative example)

[Chemical formula 17]

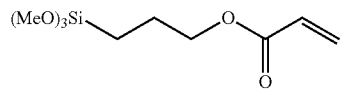

(A-5) Compound represented by the following formula (13) (KBM603 by Shin-Etsu Chemical Co., Ltd.) (for use in comparative example)

[Chemical formula 18]

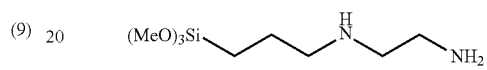

(A-6) Compound represented by the following formula (14) (by HOKKO CHEMICAL INDUSTRY CO., LTD.) (for use in comparative example)

[Chemical formula 19]

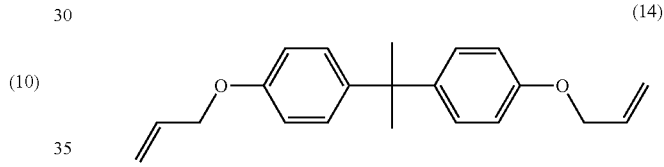

Component (F)

(F-1) Fumed silica (BET specific surface area 115 m²/g, by Shin-Etsu Chemical Co., Ltd.)

Working Examples 1 to 7, Comparative Examples 1 to 6

Organopolysiloxane compositions S1 to S13 were prepared by combining and mixing the components (A) to (E) and the component (F) in accordance with the ratios shown in Tables 1 and 2. The compositions thus prepared were then subjected to ultraviolet irradiation so as to be cured, where an EYE UV electronic control device manufactured by EYE GRAPHICS CO., LTD. (model UBX0601-01) or an ultraviolet irradiation device whose light source is a metal halide lamp (manufacturer and model are described later) was used to irradiate each composition so that an irradiation dose would be 2,000 mJ/cm² when employing an ultraviolet light having a wavelength of 365 nm.

Tables 1 and 2 show results of evaluating a surface curability of the organopolysiloxane composition and an adhesiveness to a polycarbonate substrate and a stainless-steel substrate.

In the surface curability evaluation, "○" (surface curability: favorable) was given to examples where bleeding of an uncured oil was not visually observed on the surface of the cured product, and tackiness was not felt on the surface of the cured product by finger touch; "Δ" (surface curability: partially unfavorable) was given to examples where while the bleeding of the uncured oil was not visually observed on the surface of the cured product, tackiness was felt on the surface of the cured product by finger touch; and "x" (surface curability: unfavorable) was given to examples where the bleeding of the uncured oil was visually observed on the surface of the cured product.

In the adhesiveness evaluation, there were used a polycarbonate (PC) or stainless-steel (SUS) having a width of 25 mm and a length of 50 mm, and a glass. Each of S1 to S13 prepared was then sandwiched between the glass and the PC or SUS in a manner such that an adhesion area would be 250 mm$^2$ (length 10 mm×width 25 mm), and that an adhesion thickness would be 2.0 mm, followed by performing UV irradiation with the glass surface facing upward, thereby obtaining a sample for a shear adhesion test. Using such test sample, and in accordance with JIS K 6249, a shear adhesion force (MPa) was measured, and a cohesion failure rate (CF: a ratio (%) of an area(s) exhibiting cohesion failure to the entire area of a fracture surface) was obtained.

TABLE 1

| | | Working example 1 | Working example 2 | Working example 3 | Working example 4 | Working example 5 | Working example 6 | Working example 7 |
|---|---|---|---|---|---|---|---|---|
| Organopolysiloxane composition | | S1 | S2 | S3 | S4 | S5 | S6 | S7 |
| Compounding ratio (Part by mass) | B-1 | 100 | — | 100 | 100 | 100 | 100 | — |
| | B-2 | — | 100 | — | — | — | — | — |
| | E-1 | — | — | — | — | — | — | 100 |
| | C-1 | 3 | 6 | 3 | 3 | 3 | 3 | — |
| | D-1 | 0.3 | 0.6 | 0.3 | 0.3 | 0.3 | 0.3 | — |
| | D-2 | — | — | — | — | — | — | 0.3 |
| | A-1 | 0.4 | 0.4 | — | — | — | 0.4 | 0.8 |
| | A-2 | — | — | 0.4 | — | — | — | — |
| | A-3 | — | — | — | 0.4 | 0.8 | — | — |
| | F-1 | 8 | 8 | 8 | 8 | 8 | — | — |
| Surface curability (Immediately after UV irradiation) | | ○ | ○ | ○ | ○ | ○ | ○ | ○ |
| Adhesiveness (Glass/PC) | MPa | 0.34 | 0.40 | 0.38 | 0.25 | 0.30 | 0.20 | 0.19 |
| | CF (%) | 100 | 100 | 100 | 100 | 100 | 100 | 100 |
| Adhesiveness (Glass/SUS) | MPa | 0.21 | 0.28 | 0.25 | 0.18 | 0.21 | 0.18 | 0.14 |
| | CF (%) | 100 | 100 | 100 | 100 | 100 | 100 | 100 |

TABLE 2

| | | Comparative example 1 | Comparative example 2 | Comparative example 3 | Comparative example 4 | Comparative example 5 | Comparative example 6 |
|---|---|---|---|---|---|---|---|
| Organopolysiloxane composition | | S8 | S9 | S10 | S11 | S12 | S13 |
| Compounding ratio (Part by mass) | B-1 | 100 | — | — | 100 | 100 | — |
| | B-2 | — | 100 | 100 | — | — | — |
| | E-1 | — | — | — | — | — | 100 |
| | C-1 | 3 | 6 | 6 | 3 | 3 | — |
| | D-1 | 0.3 | 0.6 | 0.6 | 0.3 | 0.3 | — |
| | D-2 | — | — | — | — | — | 0.3 |
| | A-4 | — | 0.4 | — | — | — | — |
| | A-5 | — | — | 0.4 | — | — | — |
| | A-6 | — | — | — | 0.4 | 0.8 | 0.8 |
| | F-1 | 8 | 8 | 8 | 8 | 8 | — |
| Surface curability (Immediately after UV irradiation) | | ○ | Δ | x | ○ | ○ | Δ |
| Adhesiveness (Glass/PC) | MPa | 0.00 | 0.13 | — | 0.25 | 0.22 | 0.04 |
| | CF (%) | 0 | 0 | 0 | 0 | 0 | 0 |
| Adhesiveness (Glass/SUS) | MPa | 0.01 | 0.10 | — | 0.13 | 0.13 | 0.05 |
| | CF (%) | 0 | 0 | 0 | 100 | 100 | 0 |

As shown above, the ultraviolet curable organopolysiloxane composition of the present invention was superior in ultraviolet curability, and a favorable adhesiveness was also observed with the cured product thereof.

Here, the present invention is not limited to the above embodiments. The above embodiments are merely presented as examples; any other embodiments shall be encompassed in the technical scope of the present invention, provided that the constitutions thereof are substantially identical to the technical ideas described in the scope of the claims of the present invention, and that similar functions and effects can be brought about thereby.

The invention claimed is:

1. An ultraviolet curable organopolysiloxane composition comprising:
   (A) a compound represented by the following general formula (1)

[Chemical formula 1]

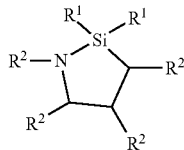
   (1)

wherein $R^1$ represents a substituted or unsubstituted monovalent hydrocarbon group having 1 to 20 carbon atoms or an alkoxy group having 1 to 3 carbon atoms, the multiple $R^1$s may be identical to or different from each other, and each $R^2$ independently represents a hydrogen atom, a substituted or unsubstituted monovalent hydrocarbon group having 1 to 20 carbon atoms or a triorganosilyl group; and
   an ultraviolet curable organopolysiloxane.

2. The ultraviolet curable organopolysiloxane composition according to claim 1, wherein in the general formula (1), the $R^2$ bonded to the nitrogen atom represents a substituted or unsubstituted monovalent hydrocarbon group or a triorganosilyl group, and each of the $R^2$s bonded to the carbon atoms independently represents a hydrogen atom or an unsubstituted monovalent hydrocarbon group having 1 to 20 carbon atoms.

3. The ultraviolet curable organopolysiloxane composition according to claim 1, comprising:
   (A) 0.05 to 10 parts by mass of the compound represented by the general formula (1);
   (B) 100 parts by mass of a linear or branched ultraviolet curable organopolysiloxane whose molecule each has on average 1 to 4 groups represented by the following general formula (2), and whose main chain is composed of repeating diorganosiloxane units

[Chemical formula 2]

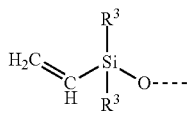
   (2)

wherein $R^3$ represents a substituted or unsubstituted monovalent hydrocarbon group having 1 to 20 carbon atoms, the multiple $R^3$s may be identical to or different from each other, and a chain line represents a bond;
   (C) 1 to 20 parts by mass of a linear or branched organopolysiloxane whose molecule each has at least two groups represented by a partial structural formula of the following general formula (3), and whose main chain is composed of repeating diorganosiloxane units

[Chemical formula 3]

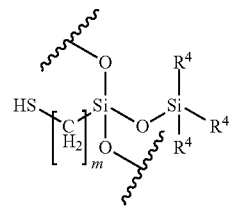
   (3)

wherein $R^4$ represents a substituted or unsubstituted monovalent hydrocarbon group having 1 to 20 carbon atoms, the multiple $R^4$s may be identical to or different from each other, and m is an integer of 1 to 20; and
   (D) 0.1 to 10 parts by mass of a photopolymerization initiator.

4. The ultraviolet curable organopolysiloxane composition according to claim 3, wherein the component (B) is a linear ultraviolet curable organopolysiloxane.

5. The ultraviolet curable organopolysiloxane composition according to claim 1, comprising:
   (A) 0.05 to 10 parts by mass of the compound represented by the general formula (1);
   (D) 0.1 to 10 parts by mass of a photopolymerization initiator; and
   (E) 100 parts by mass of an ultraviolet curable organopolysiloxane represented by the following general formula (4)

[Chemical formula 4]

$$(R^5)_3Si—X—[Si(R^5)_2O]_n—Si(R^5)_2—X—Si(R^5)_3 \quad (4)$$

wherein each $R^5$ independently represents a group selected from a substituted or unsubstituted monovalent hydrocarbon group having 1 to 10 carbon atoms, an acryloxy group, a methacryloxy group, an acryloxyalkyl group and a methacryloxyalkyl group, each molecule has at least two groups selected from an acryloxy group, a methacryloxy group, an acryloxyalkyl group and a methacryloxyalkyl group, n is an integer of 10 or larger, and X represents an oxygen atom or a divalent hydrocarbon group having 2 to 6 carbon atoms.

6. A sealing agent, coating agent or adhesive agent comprising the ultraviolet curable organopolysiloxane composition according to claim 1.

7. A molded product using a cured product of the ultraviolet curable organopolysiloxane composition according to claim 1.

* * * * *